United States Patent [19]

Vasterling

[11] 3,775,969

[45] Dec. 4, 1973

[54] CHAIN WITH ELASTOMERIC MATERIAL

[75] Inventor: Paul F. Vasterling, Westminster, Calif.

[73] Assignee: Hitco, Irvine, Calif.

[22] Filed: June 9, 1971

[21] Appl. No.: 151,326

[52] U.S. Cl. .................... 59/78, 59/79 R, 152/240
[51] Int. Cl. .......................................... F16g 13/24
[58] Field of Search .................. 59/78, 79 R, 80, 59/35; 152/240, 243, 231; 425/123, 121, 129

[56] References Cited
UNITED STATES PATENTS

| 2,452,752 | 11/1948 | Hartranft ........................ 74/245 R |
| 2,020,943 | 11/1935 | Hallquist ................................ 59/78 |
| 2,110,226 | 3/1938 | Hill ........................................ 59/78 |
| 1,659,711 | 2/1928 | Smith ..................................... 59/78 |
| 2,079,689 | 5/1937 | Gorton ................................... 59/78 |
| 2,080,627 | 5/1937 | Morgan .................................. 59/78 |
| 3,002,409 | 10/1961 | Jones ..................................... 59/78 |
| 3,084,066 | 4/1963 | Dunmire ................................ 59/78 |
| 3,298,173 | 1/1967 | Empson ................................. 59/78 |

FOREIGN PATENTS OR APPLICATIONS 539,485 9/1941 Great Britain ..................... 59/79 R Primary Examiner—Charles W. Lanham
Assistant Examiner—Gene P. Crosby
Attorney—Lavine, Cantor & Reich

[57] ABSTRACT

A chain of metal links has an elastomeric material covering the links and substantially filling the clearance spaces between the links. The chain may be in either contracted condition, or in extended condition. All links may be covered, or intermediate link or links may be uncovered, and extend at a angle to the chain axis, and/or end links may be uncovered. The chain is prepared by wrapping a metal chain in helical, overlap fashion with a strip of raw butyl rubber, after which it is heated uner pressure to cause the rubber to fill the clearance spaces in the chain, to cover the links and to become cured.

3 Claims, 5 Drawing Figures

PATENTED DEC 4 1973 3,775,969

INVENTOR
PAUL F. VASTERLING

*Lavine, Cantor & Reich*
ATTORNEYS

# 3,775,969

CHAIN WITH ELASTOMERIC MATERIAL

BACKGROUND OF THE INVENTION

The present invention relates to a chain having a coating and filling of elastomeric material, usable as either a tension device, a traction-augmenting device for wheels, or as a shock absorber.

Metal chains have long been known and used, for a number of purposes; typically, these chains are comprised of interengaged metal links. Such chains have been used as hold-down devices, as tension devices in the manner of cables, and also as traction-augmenting devices when applied to vehicle tires. In addition, it has been known to provide a generally tubular casing over the major portion of a chain, so as to prevent abrasion of the chain against the surface of a machine or vehicle with which the chain is used, as for locking a motorcycle or bicycle.

The chains previously known were not suitable for use in corrosive atmospheres, and in rigorous environmental conditions, and were subject to rusting and wear, thereby decreasing their strength over a period of time. Where chains have been used as tire chains to augment traction of vehicles, where the vehicle was driven on dry pavement the chains quickly wore through, so that it was not possible to use such chains for other than very limited periods of time on dry pavement.

Chains used as tie-down devices for tying down automobiles on transporters received repeated shock forces due to irregularities in the roads or rails, so that chains used for this purpose quickly wore out: for example, it is known that conventional chains used for tying automobiles on transporters have become worn out after as little as 300 or 400 miles of travel.

Further, where small airplanes are tied down on the parking areas of an airport, this has left the airplanes exposed to the elements, in particular to wind forces. In a number of areas, wind gusts occur which result in substantial and sudden lift forces on the aircraft wings, thereby imposing strong shock loads on the tie-down devices. As a result, the tie-down devices, such as ropes, will break, thereby releasing the airplane with resulting damage to it.

SUMMARY OF THE INVENTION

The present invention provides a chain, preferably of metal links which are interengaged, which claim is partially or fully covered and filled with an elastomeric material, such as cured butyl rubber. The elastomeric material may be applied to a chain in either its contracted condition or its extended condition. When a chain is in extended condition, a clearance space is provided between alternate links and where a chain is in contracted condition, clearance is provided between the bights of adjacent links. The links are covered or coated to a substantial thickness with the cured butyl rubber, which substantially fills the noted clearances. The end link or links of either the extended or contracted condition chains may be uncovered or uncoated, so as to provide for ready connection points, or all of the links may be completely covered or coated, so that connection can be effected by a clamping type device. In addition, an intermediate link or pair of links, or several pairs of links intermediate the length of the chain may be left uncovered, these links extending at an angle to the major axis of the chain; such an uncoveed intermediate link or links may be used either as an intermediate attachment point, or when such a chain is used as a traction augmenting device, such a link or links may serve as a stud for added traction, as in sand.

The chain with elastomeric material may be used in harsh or corrosive atmospheres, as a traction augmenting device applied to automobile tires, and as a shock absorber, and the compressed chain functions as a shock absorber, due to the fact that the elastomeric material in the clearance space between the bights of adjacent links will resiliently compress under tension forces.

The chain is manufactured by placing it in the desired condition, such as extended or contracted, helically wrapping it with a strip of raw butyl rubber which may be about 0.060 inches in thickness, the wrapping being accomplished with a suitable overlap, after which the thus wrapped chain is placed in a vacuum bag, and then the assemblage is placed in an autoclave, where the butyl rubber is cured; the pressure is 100 pounds per square inch and the temperature is preferably 250° F, the time period being 20 minutes.

DESCRIPTION OF THE PREFERRED EMBODIMENT

Figure 1:
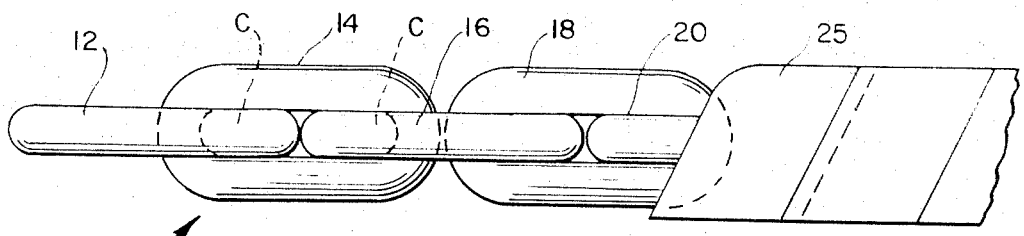
FIG. 1 discloses a chain in contracted condition, with an elastomeric strip partially covering the chain.

Referring now to the drawings, wherein like or corresponding reference numerals are used to designate like or corresponding parts throughout the several views, there is shown in FIG. 1 a chain generally designated 10 made up of a series of interengaged metal links 12, 14, 16, 18 and 20. Preferably each of the links is endless, round in cross section, and has a considerable length relative to the diameter of the metal stock of which is is formed. Thus, with regard to link 14, by way of example, the length of the link between the interior surfaces of the bight portions at either end of the link is significantly greater than the combined diameters of the stock materials of the links 12 and 16. There is thereby provided a clearance C between the interior bight portion of the right hand end of link 12, and the interior of the bight portion of the left hand end of the adjacent link 14. Similarly, there is a clearance C between the interior of the left hand bight portion of the link 16 and the interior of the right hand bight portion of the link 14. Also, the exterior surfaces of the bight portions of the alternate links 12 and 16 are in close proximity. The other links of chain 10 are similarly arranged, so that the exteriors of the bight portions of alternate links 14 and 18 are in close proximity, as are the exterior surfaces of bight portions of alternate links 16 and 20.

Figure 2:
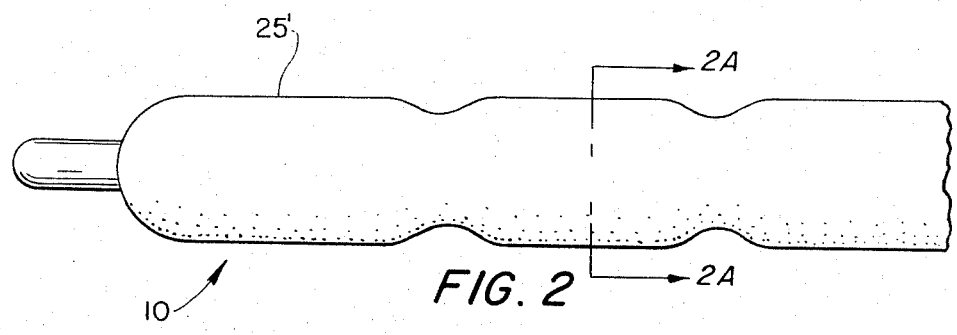
FIG. 2 is a view of a contracted chain with elastomeric material covering all of the chain.

There is also shown at the right hand portion of FIG. 2 a strip 25 of elastomeric material, preferably raw butyl rubber having a thickness of 0.060 inches. The strip 25 is shown helically wrapped on the chain with an overlay, which is preferably approximately one quarter inch for a one inch wide strip. As will be understood, in practice the chain 10 may be of practically and desired length, and the strip 25 may be applied either to all of the links, thereby entirely covering the chain links or alternatively links at the ends of the chain may be left uncovered.

Figure 2A:
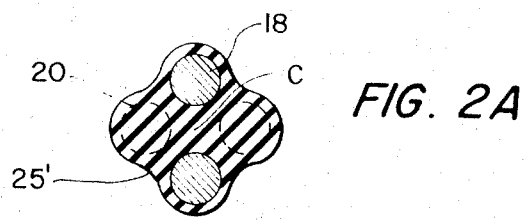
FIG. 2A is a cross sectional view taken on the line 2A — 2A of FIG. 2.

Referring now to FIG. 2, there is shown the chain 10 in its completed state. Chain 10, as above noted, is in contracted condition. All of the links of the chain will have been covered by the strip 25 of elastomeric material. The thus wrapped chain will have been placed in a suitable vacuum bag, such as Mylar, and the metal chain, the elastomeric strip wrapping and the Mylar bag will have been placed in an autoclave, where the pressure is raised to between 50 and 300 pounds per square inch, 100 p.s.i. being preferred, and the temperature is raised to 250° F. A period of at least 20 minutes is preferred, during which time the raw butyl rubber, or equivalent elastomeric material provided by the strip 25 will have melted sufficiently to cause it to cover and be in intimate contact with the outer surfaces of all of the links, to flow into the clearances C, and to become cured. Thus, as shown in FIG. 2A, the link 18 is covered with the elastomeric material, as is the adjacent link 20. In addition, the cured elastomeric material, designated 25', is shown substantially completely filling the clearance C between links 18 and 20. It will be understood that the individual links are discernable in the chain 10, so that chain 10 has a surface configuration which is generally irregular, similar to that of an uncovered chain, but somewhat attenuated due to the cured elastomeric material 25'. Otherwise stated, the chain 10 has a configuration which is somewhat less irregular than that of an uncovered chain, although it is not, as clearly shown from FIGS. 2 and 2A, cylindrical in outline.

As shown in FIG. 2, the chain 10 has all of the links thereof entirely coated or covered by the elastomeric material 25'. With such a chain, the elastomeric material in the various clearances C will compress, in a resilient manner, when tension is applied to the chain 10. Thus chain 10 will function as a shock absorbing device, and will not readily wear out when used as a tie-down for automobiles on an automobile transporter, or in other situations where repeated shock loads are applied. The chain 10 as shown in FIG. 2 may be used as a tie-down where sudden strong loads are applied, as in connection with gust-induced lift forces on a tied down airplane. In addition, of course, the chain 10 may be used in abrasive or corrosive environmental conditions, where the material 25' will protect the metal of which the chain links are formed.

While the end links of the chain 10 are shown as being covered, so that exterior gripping devices will be used to connect the chain 10 to equipment, tie-down points, and the like, it is contemplated that an end link may be partially covered, or the end link may be uncovered, together with a part of the second link, i.e., the second link being that link which is adajcent an end link.

Further, while chain 10 in FIG. 1 has been shown with alternate links in engagement, not all of the alternate links need be in engagement, so that the extent there is provided, for example, a space between the exterior surfaces of the bights of links 14 and 18, there may be provided a reduced clearnace between links 14 and 16, and between links 16 and 18. In this case, there would be less elastomeric material to be compressed, so that there would be reduction in the shock absorbing function of such a chain. Where the chain 10 is provided with all of the alternate links in engagement, electricity may be conducted through the chain, but where a separation is provided between some or all of the alternate links, the conductive path will be discontinuous, and therefore electricity will not be conducted from one end of the chain to the other.

As used herein, a chain is in its contracted condition when the axis defined by the links of the chain is substantially straight or in the form of a regular curve, and the bights of alternate links are in close proximity, there thereby being provided a clearance between the interior portions of the bights of adjacent links. As used herein, a chain is in its extended condition when the axis defined by the links of the chain is substantially straight or in the form of a regular curve, and when the bights of adjacent links are in engagement, and there is clearance between the exterior surfaces of the bights of alternate links. As will be understood, the stated conditions of the links need not obtain for all the links of the chain, since for some purposes, either some or all of the links may occupy intermediate positions, wherein neither alternate links nor adjacent links are in engagement or various combinations of link arrangements may be provided.

Figure 3:
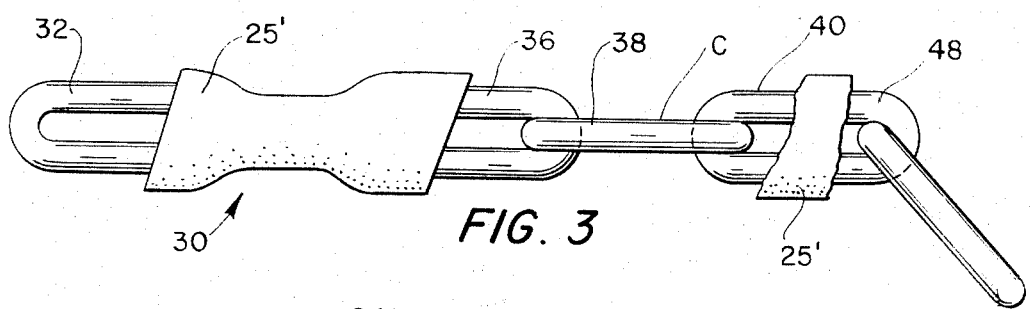
FIG. 3 is a view of a chain in extended condition, with a portion of the links being shown uncovered.

Referring now to FIG. 3, there is shown a chain 30, which is in the extended condition. In the extended or stretched condition, a link 36 will have the interior of its right hand bight portion in engagement with the interior of the right hand link bight portion of adjacent link 38. Link 40, which is adjacent to link 38, has the left hand bight portion thereof in engagement with the right hand bight portion of link 38. There is thereby provided a clearance C between the exterior surface of alternate links 36 and 40. These links are shown uncovered in FIG. 3 for purposes of clarity, it being understood that all or substantially all of the links of the chain 30 will be covered by cured elastomeric material 25', which will have been applied in the manner described above in connection with chain 10, except for the relative positioning of the links which make up the chain. The end link 32 will be seen to have approximately one half of its length uncovered and the other half of link 32 will be covered by the elastomeric material 25', which will extend into the opening in link 32. At its other end, link 48 is partially covered, and end link 50 is completely uncovered, or free of elastomeric material 25'.

The chain 30 may have both ends thereof as shown at the left end, or both ends as shown at the right end in FIG. 3. In addition, the chain 30 may have the end links completely covered, in the manner shown in FIG. 2. In addition, the chain 10 of FIG. 2 may have the ends thereof exposed as shown at either the left or right end of FIG. 3.

The chain 30 of FIG. 3, as is the chain of FIG. 2, is somewhat stiffer than an uncovered chain, by virtue of the elastomeric material 25'. Like chain 10, chain 30 may be flexed, to the extent that it may be held in coiled condition, so that, for example, both chains 10 and 30 may be reeled or trained over pulleys. Chain 30 could conduct electricity, due to the engagement of each link with its adjacent links, although as noted in connection with chain 10, the conductive path may be broken by separating adjacent links somewhat. The chain 30 is suitable for use in corrosive atmospheres such as in chemical processing plants, in abrasive atmospheres and in such harsh environments as marine use, and is also suitable for use as a traction-augmenting chain for automobile tires. The irregular outline or surface of the chain 30 will provide traction in snow, while the material 25' will protect the metal links from abrasion and wear when driven on dry pavement, and the material 25' will reduce the noise and shock of driving an automobile with chains 30 over dry pavement.

Figure 4:
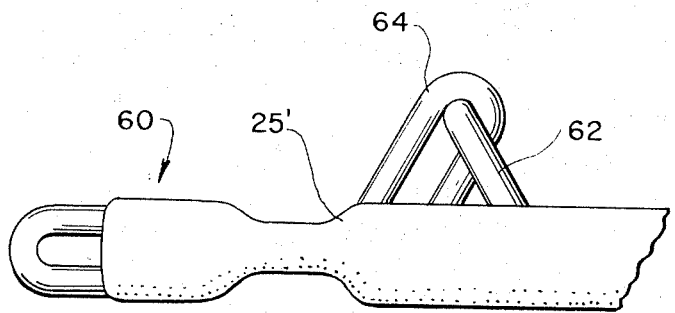
FIG. 4 is a view of a chain having a pair of intermediate links uncovered and at an angle to the chain axis.

Referring now to FIG. 4, a chain 60 is provided which is generally similar to chain 30, except that intermediate links 62 and 64 extend at angles to the major axis of the chain 60. Preferably, links 62 and 64 are not covered with the elastomeric material 25', as are substantially all of the other links of chain 60. Thus, the links 62 and 64 may perform the functions of studs when chain 60 is used as a traction-augmenting device, as, for example, in connection with an automotive vehicle being driven in sand. In addition, the exposed intermediate link 64, or link pair 62, 64 may be used as an intermediate connection point for the chain 60, so that connections to the chain 60 may be made not only at the ends but at the exemplary intermediate link 64.

As will be understood, a plurality of pairs of such links as 62 and 64 may be provided. In addition, while two links 62 and 64 have been shown extending at angles to the major axis of the chain 60, as will be understood, instead of two such links, only one link need be extended so that its axis is generally transverse to the axis of the chain 60.

There has been provided a chain having interengaged links, with an elastomeric material substantially covering the links and occupying clearances between the links. The chain may be in either extended or contracted condition, so that either alternate links are in engagement, or adjacent links are in engagement, respectively. Alternatively, some or all of the links may be in an intermediate position. The elastomeric material serves to provide some stiffness to the chain, while permitting it to be flexed to the extent that the chain may be trained over pulleys, reeled and coiled. The chains herein provided may be either electrically conductive or non-conductive. The chain may have all of the links covered, may have one or both ends exposed to a greater or lesser extent, such that either part of an end link or all of an end link, or plural end links may be uncovered. In addition, one or more intermediate links may extend at an angle to the major axis of the chain, to thereby enable such link to serve as either intermediate attachment links or where the chain is used as a traction device, such links will serve as studs.

The present invention chain may be used either as a shock absorber, as a tie-down device having shock absorbing properties, as a tension device, or as a traction-augmenting device. In addition, the herein disclosed chain may be utilized as an electrical conductor.

There has also been disclosed herein a method of manufacturing a chain, wherein the chain in any desired condition may be completely or partially wrapped in a strip of elastomeric material, with subsequent curing in an autoclave.

It will be obvious to those skilled in the art that various changes may be made without departing from the spirit of the invention and therefore the invention is not limited to what is shown in the drawings and described in the specification but only as indicated in the appended claims.

I claim:
1. A method of making a chain comprising:
   a. helically wrapping a chain with at least one strip of raw elastomeric material so that substantially all of the exterior surface of said chain is covered, and
   b. heating said chain and material under pressure for a time and at a temperature to melt and cure said material.
2. The method of claim 1, said material being butyl rubber.
3. The method of claim 2, said heating step being at approximately 250° F at a pressure of not less than 50 p.s.i. or more than 300 p.s.i. for not less than 20 minutes.

* * * * *